(12) United States Patent
Chandrasekaran

(10) Patent No.: US 12,715,385 B2
(45) Date of Patent: Aug. 25, 2026

(54) UNDERRUN PROTECTOR

(71) Applicant: Daimler Truck AG, Leinfelden-Echterdingen (DE)

(72) Inventor: Senthivinayagam Chandrasekaran, Bangalore (IN)

(73) Assignee: Daimler Truck AG, Leinfelden-Echterdingen (DE)

(*) Notice: Subject to any disclaimer, the term of this patent is extended or adjusted under 35 U.S.C. 154(b) by 468 days.

(21) Appl. No.: 18/259,001

(22) PCT Filed: Oct. 14, 2021

(86) PCT No.: PCT/JP2021/038002
§ 371 (c)(1),
(2) Date: Jun. 22, 2023

(87) PCT Pub. No.: WO2022/137751
PCT Pub. Date: Jun. 30, 2022

(65) Prior Publication Data

US 2024/0042955 A1 Feb. 8, 2024

(30) Foreign Application Priority Data

Dec. 25, 2020 (JP) ................................ 2020-216609

(51) Int. Cl.
*B60R 19/56* (2006.01)
*B60R 19/18* (2006.01)

(52) U.S. Cl.
CPC .............. *B60R 19/56* (2013.01); *B60R 19/18* (2013.01)

(58) Field of Classification Search
CPC ......... B60R 19/56; B60R 19/18; B60R 19/04; B60R 19/023; B60R 19/565
See application file for complete search history.

(56) References Cited

U.S. PATENT DOCUMENTS

2010/0171330 A1* 7/2010 Kunz ...................... B60R 19/18 293/120
2013/0181463 A1 7/2013 Yamaguchi et al.
(Continued)

FOREIGN PATENT DOCUMENTS

CN 101965277 A 2/2011
CN 103260961 A 8/2013
(Continued)

OTHER PUBLICATIONS

Textor Metal Industries; Nesting Channel & C Purlin, Designed to Nest Together; online video; https://www.youtube.com/watch?v=Mz7Z9aCvLng; accessed Jan. 30, 2026; published Feb. 1, 2014. (Year: 2014).*

(Continued)

*Primary Examiner* — Daniel J Colilla
(74) *Attorney, Agent, or Firm* — Crowell & Moring LLP

(57) ABSTRACT

Underrun protector including an inner member having an inner face portion extending along a vehicle width and height direction, a lateral face portion extending from an end on a first side in the vehicle height direction of the inner face portion to a rear side, and a longitudinal extension portion extending from a rear end of the lateral face portion to a second side in the vehicle height direction. An outer member has an outer face portion extending along the vehicle width and height direction and disposed on the rear side of the longitudinal extension portion and a lateral extension portion extending from an end on the first side in the vehicle height direction of the outer face portion to a front side and overlapping the lateral face portion on an outside in the vehicle height direction. A connection part connects the lateral face portion and the lateral extension portion.

5 Claims, 4 Drawing Sheets

(56) References Cited

U.S. PATENT DOCUMENTS

| | | | | |
|---|---|---|---|---|
| 2013/0257068 | A1 | 10/2013 | Nakazawa et al. | |
| 2016/0332588 | A1 | 11/2016 | Watanabe et al. | |
| 2018/0281710 | A1* | 10/2018 | Lindblom | B60R 19/44 |
| 2021/0291908 | A1* | 9/2021 | Hasegawa | B60R 19/18 |

FOREIGN PATENT DOCUMENTS

| | | | | | |
|---|---|---|---|---|---|
| CN | 106143373 | A | | 11/2016 | |
| CN | 106828375 | B | * | 1/2020 | B60R 19/18 |
| EP | 2 261 086 | A1 | | 12/2010 | |
| EP | 2 653 351 | A1 | | 10/2013 | |
| JP | 2003-267170 | A | | 9/2003 | |
| JP | 2004-237878 | A | | 8/2004 | |
| JP | 2006-36071 | A | | 2/2006 | |
| JP | 2007-186080 | A | | 7/2007 | |
| JP | 2008260367 | A | * | 10/2008 | |
| JP | 2009-255900 | A | | 11/2009 | |
| JP | 2011-195041 | A | | 10/2011 | |
| JP | 2019-156188 | A | | 9/2019 | |
| KR | 10-2010-0115812 | A | | 10/2010 | |
| WO | WO 2007/129959 | A1 | | 11/2007 | |
| WO | WO 2009/107670 | A1 | | 9/2009 | |
| WO | WO 2012/081176 | A1 | | 6/2012 | |

OTHER PUBLICATIONS

PCT/JP2021/038002, English-language Written Opinion (PCT/IB/373 and PCT/ISA/237) dated Jun. 13, 2023 (Six (6) pages).

PCT/JP2021/038002, International Search Report dated Dec. 7, 2021 (Two (2) pages).

PCT/JP2021/038002, Japanese-language of Written Opinion (PCT/ISA/237) dated Dec. 7, 2021 (Five (5) pages).

Japanese-language Japanese Office Action issued in Japanese Application No. 2020-216609 dated Oct. 17, 2023, with English translation (12 pages).

Chinese-language Office Action issued in Chinese Application No. 202180086678.4 dated Jul. 7, 2025 with partial English translation (13 pages).

European Office Action issued in European Application No. 21 909 909.0 dated Mar. 5, 2026 (5 pages).

* cited by examiner

Prior Art

UNDERRUN PROTECTOR

TECHNICAL FIELD

The present invention relates to an underrun protector provided to a front portion and/or a rear portion of a vehicle.

BACKGROUND ART

Vehicles having larger heights, such as trucks, are equipped with one or more underrun protectors to prevent other vehicles having smaller heights, such as ordinary cars and mini-cars, from going underneath in collisions. In general, the underrun protector extends in a vehicle width direction at a front and/or a rear of a vehicle frame, and is fixed to the vehicle frame via stays (brackets) (see Patent Document 1 for example).

PRIOR ART DOCUMENTS

Patent Literature

[Patent Document 1] Japanese Laid-Open Patent Publication No. 2007-186080

SUMMARY OF INVENTION

Technical Problem

The underrun protectors for preventing the underneath lodging of other vehicles as described above require strengths (load bearing strengths) so as to be capable of withstanding collisions with other vehicles. In recent years, the strengths required in the underrun protectors have been further increasing.

The present invention has been devised in view of the above-mentioned problems, and one of the objects of the present invention is to provide an underrun protector having an increased strength.

Solution to Problem

The present invention has been made to solve at least a part of the above problems, and can be realized as the following aspects or application examples.

(1) An underrun protector according to the present application example is provided to at least one of a front portion and a rear portion of a vehicle, and includes: an inner member having an inner face portion extending along a vehicle width direction and a vehicle height direction, a lateral face portion extending from at least an end on a first side in the vehicle height direction of the inner face portion to an outside in a vehicle length direction, and a longitudinal extension portion extending from an outer end in the vehicle length direction of the lateral face portion to at least a second side in the vehicle height direction; an outer member having an outer face portion extending along the vehicle width direction and the vehicle height direction, and a lateral extension portion extending from at least an end on the first side in the vehicle height direction of the outer face portion to an inside in the vehicle length direction, the outer face portion being disposed on an outside in the vehicle length direction of the longitudinal extension portion, the lateral extension portion overlapping the lateral face portion on an outside in the vehicle height direction, an end on the second side in the vehicle height direction of the outer face portion being connected to an end on the second side in the vehicle height direction of the inner face portion; and a connection part connecting the lateral face portion and the lateral extension portion overlapping each other.

According to such an underrun protector, the outer face portion of the outer member is reinforced by the longitudinal extension portion extending from the lateral face portion of the inner member, and the lateral face portion of the inner member is reinforced by the lateral extension portion extending from the outer face portion of the outer member. Therefore, it is possible to provide the underrun protector having an increased strength (load bearing strength). Thereby, the occurrence of buckling can be suppressed against the collision load input to the outer face portion.

(2) In the underrun protector according to the present application example: the inner member may include a pair of the lateral face portions each extending from one of both ends in the vehicle height direction of the inner face portion to the outside in the vehicle length direction and a pair of the longitudinal extension portions respectively extending from outer ends in the vehicle length direction of the pair of the lateral face portions to a direction approaching each other; and the outer member may include a pair of the lateral extension portions each extending from one of both ends in the vehicle height direction of the outer face portion to the inside in the vehicle length direction and respectively overlapping the lateral face portions on the outside in the vehicle height direction.

As such, by the provision of the pair of the lateral face portions and the pair of the longitudinal extension portions in the inner member and the pair of the lateral extension portions in the outer member, the configurations of the inner member and the outer member can be symmetrical on both sides in the vehicle height direction. This can reduce a load in manufacturing and/or assembling.

(3) In the underrun protector according to the present application example, the outer face portion may be disposed so as to be in contact with the longitudinal extension portion.

If the outer face portion of the outer member is disposed so as to be in contact with the longitudinal extension portion of the inner member, the transmission efficiency of the collision load from the outer face portion to the longitudinal extension portion can be increased. This further reduces the collision load to be transmitted from the outer member to the inner member through the connection part, so that the load to be exerted on the connection part can be further reduced. Therefore, the strength required for the connection part can be further suppressed.

In addition, as compared with a disposition of the outer face portion spaced away from the longitudinal extension portion, the disposition of the outer face portion being in contact with the longitudinal extension portion can enlarge the overlapping range between the lateral extension portion extending from the outer face portion and the lateral face portion from which the longitudinal extension portion extends. This can further suppress the occurrence of buckling against the collision load input to the outer face portion.

(4) In the underrun protector according to the present application example, the connection part may be a welded part connecting the lateral face portion and the lateral extension portion by welding, and may be intermittently provided in the vehicle width direction.

As compared with a welded part extending over the entire range in the vehicle width direction, the welded part intermittently provided as such can facilitate the welding operation, and also can suppress the deformation due to welding heat in the underrun protector. Therefore, it is possible to enhance both the manufacturing efficiency and the form accuracy of the underrun protector.

(5) In the underrun protector according to the present application example, the connection part may be provided at a position closer to the outer face portion than an intermediate position between the inner face portion and the outer face portion is to the outer face portion.

Such an arrangement of the connection part can suppress the dimension along the vehicle length direction of the lateral extension portion, contributing to a reduction in the weight and the material cost of the outer member, while suppressing the occurrence of buckling as described above.

(6) In the underrun protector according to the present application example, a board thickness of the outer member may be smaller than a board thickness of the inner member.

By setting the board thickness of the outer member smaller than the board thickness of the inner member, the weight and the material cost of the outer member can be reduced as compared with the setting of the board thickness of the outer member equal to the board thickness of the inner member.

(7) In the underrun protector according to the present application example, the outer member may be formed of a material having a lower tensile strength as compared to the inner member.

Since the material costs decrease with the tensile strengths in general, application of a material having a tensile strength lower than that of the inner member to the outer member can reduce the material cost of the outer member as compared with the case of applying a material having a tensile strength equal to that of the inner member to the outer member.

Advantageous Effects

According to the present invention, the underrun protector having an increased strength can be provided.

DESCRIPTION OF EMBODIMENT(S)

Figure 1:
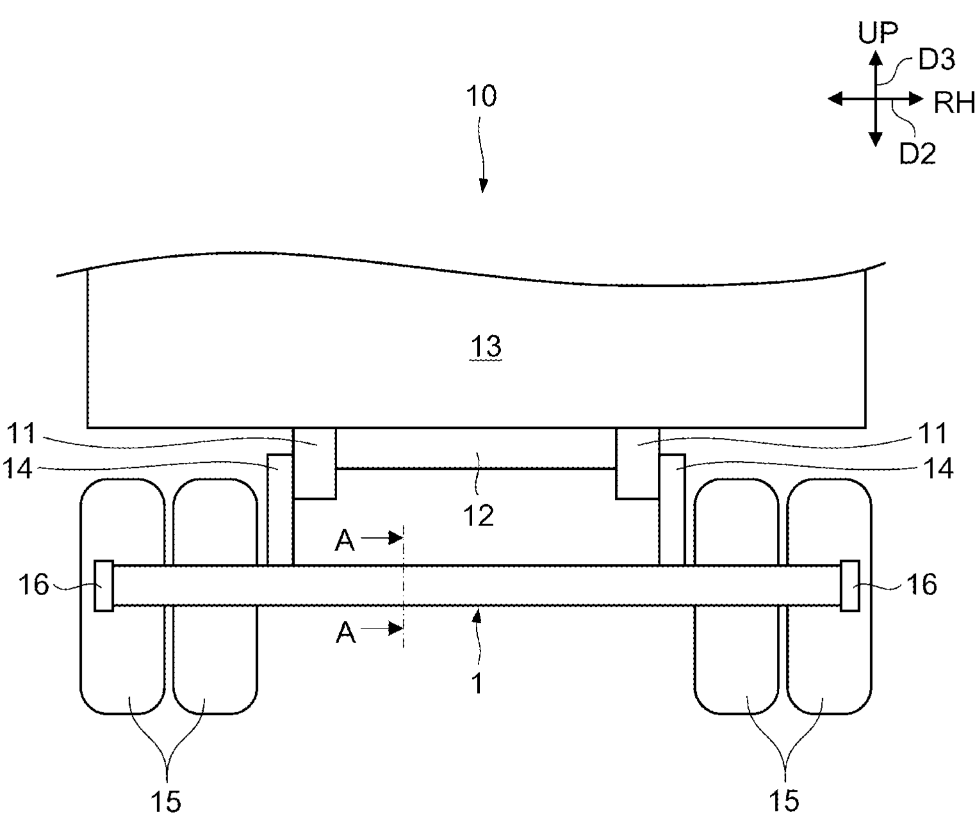
FIG. 1 is a schematic rear view of a main part of a vehicle to which an underrun protector according to an embodiment is applied.

Referring to the drawings, an embodiment of the present invention will now be described. The following embodiment is merely illustrative and there is no intention to exclude the application of various modifications and techniques not explicitly described in this embodiment. The configurations of the following embodiment may be variously modified and implemented without departing from the gist thereof. Also, the configurations can be selected or omitted according to the requirement, or can be combined appropriately.

1. Configuration

[1-1. Overall Configuration]

As illustrated in FIG. 1, an underrun protector 1 according to the present embodiment is provided to at least one of a front portion and a rear portion of a vehicle having a large vehicle height, and has a function of preventing other vehicles having vehicle heights lower than that of the vehicle 10 from lodging under a lower portion of the vehicle 10. Here, the underrun protector 1 is illustrated as a rear underrun protector (RUPD; Rear Underrun Protecting Device) provided to the rear portion of the vehicle 10 being a truck.

Hereinafter, a front-rear direction of the vehicle 10 is also referred to as a vehicle length direction D1, and a left-right direction of the vehicle 10 is also referred to as a vehicle width direction D2. An up-down direction orthogonal to both the vehicle length direction D1 and the vehicle width direction D2 is also referred to as a vehicle height direction D3. In the drawings, the front side is denoted by "FR", the right side is denoted by "RH", and the upper side is denoted by "UP".

The vehicle 10 is provided with a pair of side rails 11 each extending in the vehicle length direction D1. The pair of side rails 11 are disposed so as to be apart from each other in the vehicle width direction D2. Between the pair of side rails 11, multiple cross members 12 extending in the vehicle width direction D2 are disposed. The side rails 11 and the cross members 12 constitute a ladder frame (vehicle body frame) in a ladder shape. On the side rails 11 and the cross members 12, a cargo box 13, for example, is disposed.

A pair of stays (brackets) 14 are fixed to the rear portions of the pair of side rails 11, respectively. Each of the stays 14 extends downwardly to the rear side from the side rail 11, and connects the side rail 11 and the underrun protector 1.

The underrun protector 1 is disposed on the rear side of the side rails 11, the stays 14, and the left and right rear wheels 15, and extends in the vehicle width direction D2. Here, the illustrative underrun protector 1 extends outside in the vehicle width direction D2 further than the pair of stays 14. Incidentally, caps 16 are attached to left and right ends of the underrun protector 1.

[1-2. Main Configuration]

Hereinafter, the configuration of the underrun protector 1 will be described with respect to a state in which the underrun protector 1 is mounted on the vehicle 10. In the underrun protector 1, which is a rear underrun protector provided to the rear portion of the vehicle 10 as described above, the outside in the vehicle length direction D1 corresponds to the rear side, and the inside in the vehicle length direction D1 corresponds to the front side. Therefore, in the description regarding the underrun protector 1 of the present embodiment, the outside in the vehicle length direction D1 is also referred to as the rear side, and the inside in the vehicle length direction D1 is also referred to as the front side.

Figure 2:
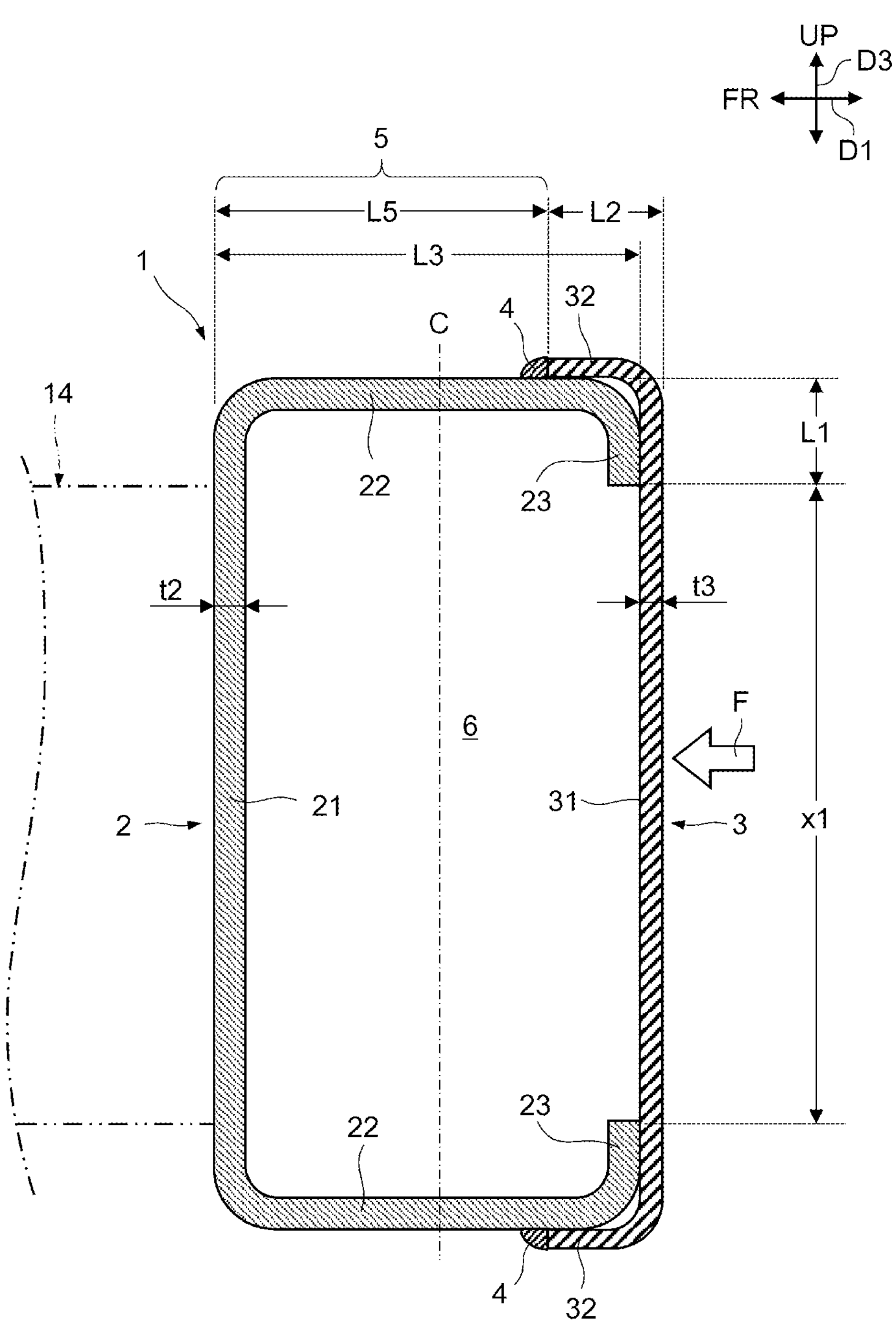
FIG. 2 is a cross sectional view of the underrun protector of FIG. 1 (A-A arrow view of FIG. 1).

As illustrated in FIG. 2, the underrun protector 1 of the present embodiment forms a closed cross sectional structure in which the cross section perpendicular to the vehicle width direction D2 is in a substantially rectangular shape. The underrun protector 1 includes: an inner member 2 attached to the stays 14; an outer member 3 disposed on the rear side (outside in the vehicle length direction D1) of the inner member 2; and connection parts 4 connecting the inner member 2 and the outer member 3 to each other. Here, the illustrative underrun protector 1 includes multiple connection parts 4 that connect the inner member 2 and the outer member 3 to each other on both sides in the vehicle height direction D3 (upper side and lower side) of the inner member 2 and the outer member 3. The inner member 2 and the outer member 3 which are connected by each of the connection parts 4 form a hollow part 6 that extends in the vehicle width direction D2.

Both the inner member 2 and the outer member 3 of the present embodiment are formed of plate-like members. Here, the illustrative inner member 2 and outer member 3 are formed by roll forming processes using steel plates each having a uniform thickness.

It should be noted that the board thickness t3 of the outer member 3 of the present embodiment is smaller than the board thickness t2 of the inner member 2 (t3<t2). In other words, the outer member 3 is formed of a steel plate having a thickness smaller (thinner) than that of the steel plate used for the inner member 2.

Further, the outer member 3 of the present embodiment is formed of a material having a lower tensile strength as compared to the inner member 2. In other words, the tensile strength S3 of the material used for the outer member 3 is lower than the tensile strength S2 of the material used for the inner member 2 (S3<S2).

The inner member 2 of the present embodiment has: an inner face portion 21 extending along the vehicle width direction D2 and the vehicle height direction D3; a pair of lateral face portions 22 each extending from one of both ends (upper end and lower end) in the vehicle height direction D2 of the inner face portion 21 to the rear side (outside in the vehicle length direction D1); and a pair of longitudinal extension portions 23 respectively extending from rear ends (outer ends in the vehicle length direction D1) of the pair of lateral face portions 22 to a direction approaching each other. With the inner face portion 21, the pair of lateral face portions 22, and the longitudinal extension portions 23, the cross section of the inner member 2 forms a substantial C-shape.

The inner face portion 21 is formed into a substantially flat plate shape. The inner face portion 21 is fastened to the rear ends of the stays 14 by, for example, bolts and nuts (both of which are not shown).

The pair of lateral face portions 22 are disposed so as to be apart from each other in the vehicle height direction D3. Here, the illustrative pair of lateral face portions 22 are arranged in parallel with each.

The pair of longitudinal extension portions 23 respectively extend from the pair of lateral face portions 22 along the vehicle height direction D3, and are arranged apart from each other in the vehicle height direction D3. Specifically, the upper longitudinal extension portion 23 extends downward from the rear end of the upper lateral face portion 22, and the lower longitudinal extension portion 23 extends upward from the rear end of the lower lateral face portion 22. Here, the illustrative positions in the vehicle length direction D1 of the pair of longitudinal extension portions 23 are aligned with each other. The distance x1 between the pair of longitudinal extension portions 23 in the vehicle height direction D3 is longer than the dimension L1 of each longitudinal extension portion 23 in the vehicle height direction D3 (x1>L1).

In the inner member 2, each of the corners between the inner face portion 21 and the lateral face portions 22, and the corners between the lateral face portions 22 and the longitudinal extension portions 23 is shaped into a curve so as to form a smooth arc.

The outer member 3 of the present embodiment has: an outer face portion 31 extending along the vehicle width direction D2 and the vehicle height direction D3; and a pair of lateral extension portions 32 each extending from one of both ends in the vehicle height direction D3 (upper end and lower end) of the outer face portion 31 to the front side (inside in the vehicle length direction D1). With the outer face portion 31 and the pair of lateral extension portions 32, the outer member 3 forms a channel shape. That is, the cross section of the outer member 3 forms a substantial U-shape.

The outer face portion 31 is formed into a substantially flat plate shape. The outer face portion 31 is disposed on the rear side (outside the vehicle length direction D1) of each longitudinal extension portion 23 of the inner member 2. The outer face portion 31 of the present embodiment is disposed so as to be in contact with each of the longitudinal extension portions 23.

Both ends in the vehicle height direction D3 of the outer face portion 31 are connected to both ends in the vehicle height direction of the inner face portion 21 of the inner member 2. That is, the upper end (an end on a first side in the vehicle height direction D3) of the outer face portion 31 is connected to the upper end (an end on the first side in the vehicle height direction D3) of the inner face portion 21, and the lower end (an end on a second side in the vehicle height direction D3) of the outer face portion 31 is connected to the lower end (an end on the second side in the vehicle height direction D3) of the inner face portion 21.

In the present embodiment, the upper lateral extension portion 32, which extends from the upper end of the outer face portion 31, is connected (welded) to the upper lateral face portion 22, which extends from the upper end of the inner face portion 21, by the upper connection parts 4, and thereby, the upper end of the outer face portion 31 is connected to the upper end of the inner face portion 21. Similarly, the lower lateral extension portion 32, which extends from the lower end of the outer face portion 31, is connected (welded) to the lower lateral face portion 22, which extends from the lower end of the inner face portion 21, by the lower connection parts 4, and thereby, the lower end of the outer face portion 31 is connected to the lower end of the inner face portion 21.

The pair of lateral extension portions 32 are arranged to be apart from each other in the vehicle height direction D3, and respectively overlap the pair of lateral face portions 22 of the inner member 2 on the outside in the vehicle height direction D3. Specifically, the upper lateral extension portion 32 overlaps the upper lateral face portion 22 on the upper side, and the lower lateral extension portion 32 overlaps the lower lateral face portion 22 on the lower side. In the present embodiment, since the outer face portion 31 is disposed so as to be in contact with the longitudinal extension portions 23, nearly entire area of the lateral extension portions 32 extending from the ends in the vehicle height direction D3 of the outer face portion 31 overlaps with the lateral face portions 22 in the vehicle height direction D3.

Each of the lateral extension portions 32 is formed shorter in the vehicle length direction D1 than the lateral face portion 22. Here, an example is shown in which the dimension L2 in the vehicle length direction D1 of each lateral extension portion 32 is less than half of the dimension L3 in the vehicle length direction D1 of the lateral face portion 22 (L2<L3/2). Incidentally, from the viewpoint of reducing the weight and material cost of the outer member 3, the dimension L2 in the vehicle length direction D1 of the lateral extension portion 32 is preferably set small within a range that secures a region overlapping with the lateral face portion 22 in the vehicle height direction D3.

In the outer member 3, each of the corners between the outer face portion 31 and the lateral extension portions 32 is shaped into a curve so as to form a smooth arc. It should be noted that, for being disposed outside the corners between the lateral face portion 22 and the longitudinal extension portions 23 of the inner member 2, each of the corners between the outer face portion 31 and the lateral extension portions 32 of the outer member 3 is formed so as to have a curvature larger than that of each of the corners between the lateral face portion 22 and the longitudinal extension portions 23.

The connection parts 4 connect the lateral face portions 22 and the lateral extension portions 32 overlapping each other. Specifically, at least one (upper) connection part 4 connects the upper lateral face portion 22 and the lateral extension portion 32 arranged on the upper lateral face portion 22, and the remaining (lower) connection parts 4 connect the lower lateral face portion 22 and the lateral extension portion 32 arranged below the lower lateral face portion 22.

Each connection part 4 of the present embodiment is provided at a position closer to the outer face portion 31 than the intermediate position C between the inner face portion 21 and the outer face portion 31 is to the outer face portion 31. More specifically, each connection part 4 is provided adjacent to the front end (inner end in the vehicle length direction D1) of the lateral extension portion 32.

The connection parts 4 of the present embodiment are welded parts connecting, by welding, the lateral face portions 22 and the lateral extension portions 32 overlapping with each other. The connection parts 4 being the welded parts connect the front ends of the lateral extension portions 32 to the outer surfaces in the vehicle height direction D3 of the lateral face portions 22 by welding.

Figure 3:
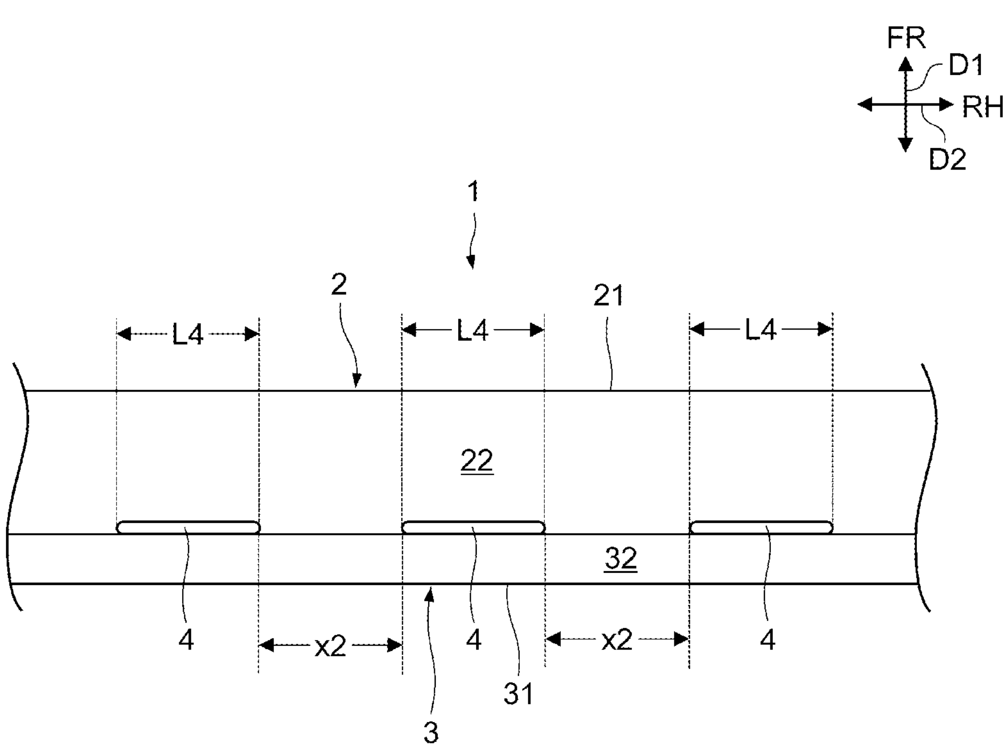
FIG. 3 is a top view illustrating welded parts of the underrun protector of FIG. 1.

As illustrated in FIG. 3, the connection parts 4 being the welded parts are intermittently provided in the vehicle width direction D2. Here, the illustrative connection parts 4 are arranged at equal intervals along the vehicle width direction D2. The distances (intervals) x2 between the adjacent connection parts 4 are, for example, set equal to the dimension L4 in the vehicle width direction D2 of each connection part 4 (x2=L4).

2. Actions and Effects

Figure 4:
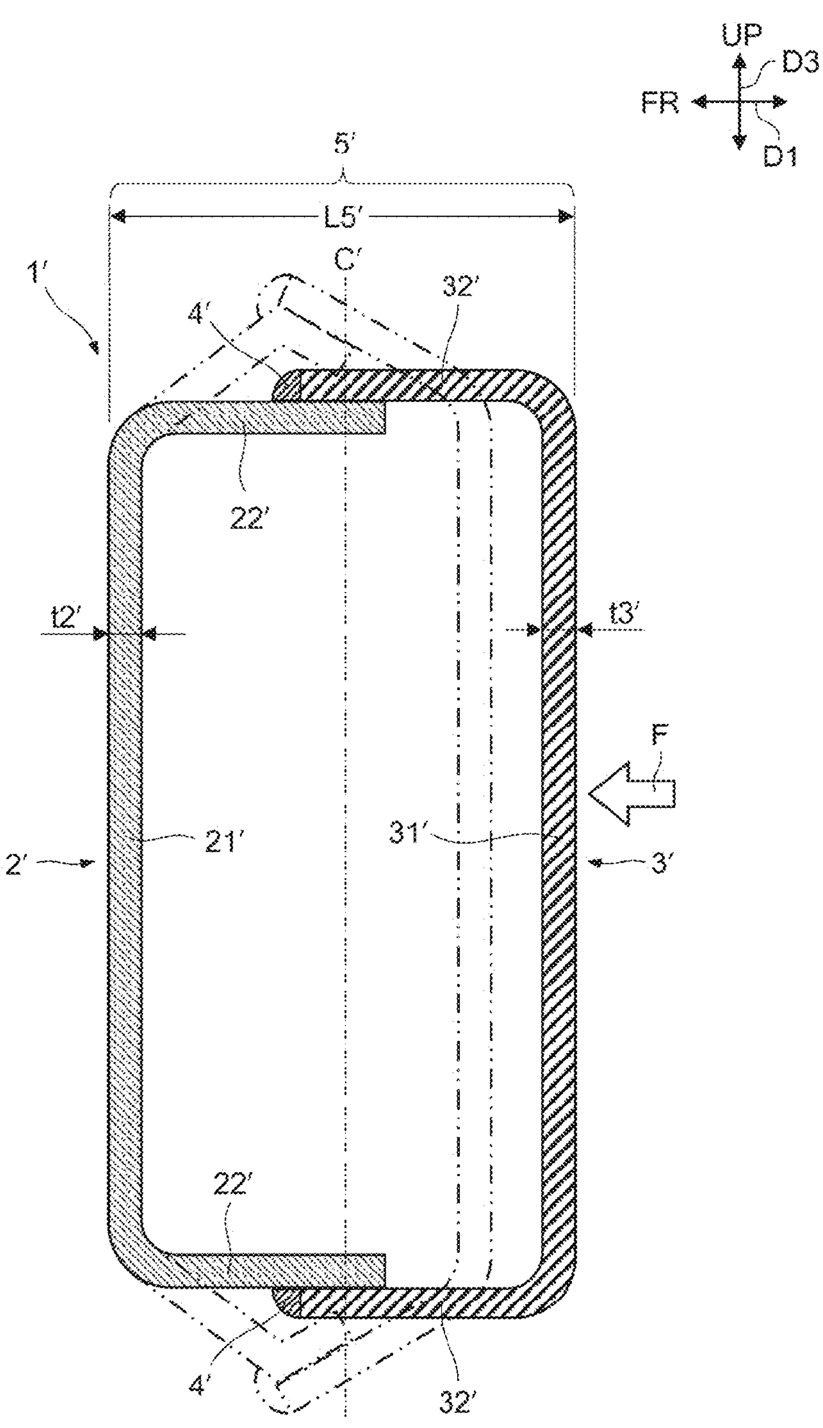
FIG. 4 is a cross sectional view (a diagram corresponding to FIG. 2) of a conventional underrun protector.

As illustrated in FIG. 4, a conventional underrun protector 1' had a structure in which an inner member 2' and an outer member 3' each forming a channel shape (substantially U-shaped cross section) were connected to each other by a pair of upper and lower welded parts 4'. More specifically, the tips of flange portions 32' of the outer member 3' were arranged outside in the vehicle height direction D3 (upper side and lower side) of flange portions 22' of the inner member 2', and the flange portions 22', 32' were connected to each other by the welded parts 4'. Further, the conventional welded parts 4' were provided at positions closer to the inner face portion 21' than the intermediate position C' between an inner face portion 21' of the inner member 2' and an outer face portion 31' of the outer member 3' is to the inner face portion 21'.

In such a conventional underrun protector 1', the entire flange portions 22', 32' that were connected by the welded parts 4' (the whole area between the inner face portion 21' and the outer face portion 31') configured effective parts 5' having a risk of buckling under a collision load F in the vehicle length direction D1. For this reason, regarding the conventional underrun protector 1', when calculating the buckling load P expressed by the following Equation (1), the buckling length L was substituted by the dimension L5' in the vehicle length direction D1 of the effective parts 5', which corresponded to the entire length in the vehicle length direction D1 of the underrun protector 1'.

$$P = (\pi^2 \cdot E \cdot I) / (L^2) \qquad \text{Equation (1)}$$

Incidentally, in the above equation (1), "E" is the Young's modulus, and "I" is the second area moment.

As expressed by the above equation (1), it can be understood that, when the Young's modulus E and the second area moment I are both fixed values, the shorter the buckling length L is, the larger the buckling load P becomes, so that the buckling is less likely to occur (the required strength is easily ensured).

Further, in the conventional underrun protector 1', since the inner member 2' and the outer member 3' each in a channel shape were connected by the welded parts 4', the collision load F input to the outer face portion 31' was transmitted from the flange portions 32' of the outer member 3' to the flange portions 22' of the inner member 2' through the connection parts 4'. That is, in the conventional underrun protector 1', the collision load F was transmitted from the outer member 3' to the inner member 2' mainly through the welded parts 4'. For this reason, the conventional welded parts 4' required a high strength capable of withstanding the collision load F, and thus, needed to be extended (continuously) over the entire area in the vehicle width direction D2 of the underrun protector 1'.

Furthermore, the conventional underrun protector 1' did not include a structure that reinforced the outer face portion 31' to which the collision load F was to be input, so that the outer face portion 31' also required a high strength capable of withstanding the collision load F. Therefore, in the conventional underrun protector 1', it was difficult to make the board thickness t3' of the outer member 3' smaller than the board thickness 2*t*' of the inner member 2'.

Further, as illustrated by two-dot chain lines in FIG. 4, in the conventional underrun protector 1', since the welded parts 4' were provided at positions closer to the inner face portion 21' than the above-described intermediate position C' is to the inner face portion 21', when the collision load F was input, each of the flange portions 22', 32' was deformed in a mode bending at the welded part 4' to form a V-shape.

On the other hand, according to the underrun protector 1 of the present embodiment, the following actions and effects can be obtained.

(1) As illustrated in FIG. 2, in the underrun protector 1, the longitudinal extension portions 23 extend from the lateral face portions 22 of the inner member 2, and the lateral extension portions 32 extend from the outer face portion 31 of the outer member 3. Accordingly, the outer face portion 31 of the outer member 3 can be reinforced by the longitudinal extension portions 23, and the lateral face portion 22 of the inner member 2 can be reinforced by the lateral extension portions 32. Therefore, it is possible to provide the underrun protector 1 having an increase strength (load bearing strength).

Specifically, in the underrun protector 1, since the longitudinal extension portions 23 and the lateral extension portions 32 are provided, parts of the lateral face portions 22, which parts not overlapping with the lateral extension portions 32, can be adopted as the effective parts 5 having a risk of buckling under the collision load F in the vehicle length direction D1. As a result, the dimension L5 in the vehicle length direction D1 of the effective parts 5 can be shorter than the total length (corresponding to L5+L2) in the vehicle length direction D1 of the underrun protector 1.

As such, when calculating the buckling load P regarding the underrun protector 1, the dimension L5 in the vehicle length direction D1 of the effective parts 5, which is to be substituted for the buckling length L, can be shorter than the entire length in the vehicle length direction D1 of the underrun protector 1 by the dimension L2 in the vehicle length direction D1 of the lateral extension portions 32. Accordingly, in the underrun protector 1, the buckling length L can be shorter as compared with the conventional underrun protector 1', so that a large buckling load P can be easily secured.

As a consequence, the underrun protector 1 can suppress the occurrence of buckling even when the collision load F is input to the outer face portion 31 and the compressive load in the vehicle length direction D1 is applied by the collision load F and the reaction force acting on the inner face portion 21 from the stays 14. Thus, the underrun protector 1 can be effectively inhibited from compressively deforming in the vehicle length direction D1.

In addition, since the outer face portion 31 of the outer member 3 is disposed outside in the vehicle length direction D1 of the longitudinal extension portions 23 of the inner member 2, the collision load F input to the outer face portion 31 can be directly transmitted from the outer face portion 31 to the longitudinal extension portions 23 (even without passing through the connection parts 4). This reduces the collision load F transmitted from the outer member 3 to the inner member 2 through the connection parts 4, leading to a reduction in the load applied to the connection parts 4. Thus, the strength required for the connection parts 4 is suppressed, and therefore, the structure of the connection parts 4 can be simplified and/or the cost relating to the connection parts 4 can be reduced.

(2) If the lateral face portions 22 and the longitudinal extension portions 23 of the inner member 2 and the lateral extension portions 32 of the outer member 3 are provided in pairs, the configurations of the inner member 2 and the outer member 3 can be symmetrical on both sides in the vehicle height direction. This can reduce a load in manufacturing and/or assembling.

(3) When the outer face portion 31 of the outer member 3 is disposed so as to be in contact with the longitudinal extension portions 23 of the inner member 2, the transmission efficiency of the collision load F from the outer face portion 31 to the longitudinal extension portions 23 can be increased. Thus, the load to be exerted on the connection parts 4 can be further reduced, and the strength required for the connection parts 4 can be further suppressed.

In addition, as compared with a disposition of the outer face portion 31 spaced away from the longitudinal extension portions 23, the disposition of the outer face portion 31 being in contact with the longitudinal extension portions 23 can enlarge the overlapping range between the lateral extension portions 32 extending from the outer face portion 31 and the lateral face portions 22 from which the longitudinal extension portions 23 respectively extend. As a result, the dimension L5 in the vehicle length direction D1 of the effective parts 5 can be further shortened, so that the buckling load P can be further increased. Therefore, it is possible to provide the underrun protector 1 having a further increased strength.

(4) In the underrun protector 1, since the load applied to the connection parts 4 is reduced as described above, even when the connection parts 4 are the welded parts intermittently provided in the vehicle width direction D2, the strength required for the connection parts 4 can be ensured. Further, as compared with the conventional welded parts 4' extending over the entire area in the vehicle width direction D2, the welded parts intermittently provided as such can facilitate the welding operation, and also can suppress the deformation due to welding heat in the underrun protector 1. Therefore, it is possible to enhance both the manufacturing efficiency and the form accuracy of the underrun protector 1.

(5) If the connection part 4 is provided at a position closer to the outer face portion 31 than the intermediate position C between the inner face portion 21 and the outer face portion 31 is to the outer face portion 31, it is possible to suppress the dimension L2 along the vehicle length direction D1 of the lateral extension portion 32 while suppressing the occurrence of buckling as described above. Therefore, the weight and the material cost of the outer member 3 can be reduced.

(6) In the underrun protector 1, since the outer face portion 31 of the outer member 3 is reinforced by the longitudinal extension portions 23 of the inner member 2 as described above, even if the board thickness t3 of the outer member 3 is smaller than the board thickness t2 of the inner member 2, the strength required for the outer face portion 31 can be ensured. Further, as compared with the case where the board thickness t3 of the outer member 3 is equal to the board thickness t2 of the inner member 2, when the board thickness t3 of the outer member 3 is smaller than the board thickness t2 of the inner member 2 as described above, the weight and the material cost of the outer member 3 can be reduced.

(7) In the underrun protector 1, since the outer face portion 31 of the outer member 3 is reinforced by the longitudinal extension portions 23 of the inner member 2 as described above, even when the outer member 3 is formed of a material having a lower tensile strength as compared to the inner member 2, the strength required for the outer face portion 31 can be ensured. In addition, since the material costs decrease with the tensile strengths in general, application of a material having a tensile strength lower than that of the inner member 2 to the outer member 3 as described above can reduce the material cost of the outer member 3 as compared to the case of applying a material having a tensile strength equal to that of the inner member 2 to the outer member 3.

(8) As shown in FIG. 2 for example, if the distance x1 in the vehicle height direction D3 between the pair of longitudinal extension portions 23 is secured to be longer than the dimension L1 in the vehicle height direction D3 of each longitudinal extension portion 23, the weight and the material cost of the inner member 2 can be reduced while the outer face portion 31 is reinforced by each longitudinal extension portion 23 as described above.

3. Modifications

Each configuration of the inner member 2 and the outer member 3 is merely an example. Various dimensions, the board thicknesses, tensile strengths, and the likes relating to the inner member 2 and the outer member 3 should not be limited to those exemplarily described above. For example, the inner member 2 and the outer member 3 may have the same board thickness, and/or may be formed of materials having the same tensile strength.

Instead of being provided on both upper and lower sides (in a pair), the lateral face portion 22 and the longitudinal extension portion 23 of the inner member 2 may be provided on only one of the upper side and the lower side. Specifically, an applicable lateral face portion 22 extends from at least one of the upper and lower ends of the inner face portion 21 (at least an end on a first side in the vehicle height direction D3 of the inner face portion 21) to the rear side. Further, an applicable longitudinal extension portion 23 extends from the rear end of the lateral face portion 22 to at least one of the lower and upper sides (to at least a second side in the vehicle height direction D3).

The same applies to the lateral extension portion 32 of the outer member 3. An applicable lateral extension portion 32 extends from at least one of the upper and the lower ends of the outer face portion 31 (at least an end on the first side in the vehicle height direction D3) to the front side, and overlaps the lateral face portion 22 on the outside in the vehicle height direction D3.

Even when each of the lateral face portion 22, the longitudinal extension portion 23, and the lateral extension portion 32 is provided singly, one of the upper and lower ends of the outer face portion 31 (an end on the second side in the vehicle height direction), that is an end opposite to the end from which the lateral extension portion 32 extends, is connected to one of the upper and lower ends of the inner face portion 21 (an end on the second side in the vehicle height direction D3), that is an end opposite to the end from which the lateral face portion 22 extends. The structure for connecting the upper or lower end of the inner face portion 21 to the upper or lower end and the outer face portion 31 as such is not particularly limited, but an applicable structure may be, for example, as in the conventional underrun protector 1' shown in FIG. 4, a weld of the flange portions respectively extending from the inner face portion 21 and the outer face portion 31 and overlapping each other. Alternatively, the upper or lower end of the inner face portion 21 may be connected to the upper or lower end of the outer face portion 31 via a bridging member different from the inner member 2 and the outer member 3.

Each of the lateral face portion 22, the longitudinal extension portion 23, and the lateral extension portion 32 is preferably provided on, of the upper and the lower sides of the underrun protector 1, at least the side on which the collision load F is expected to be larger. As in the above embodiment, if the stays 14 extend obliquely upward from the central portion in the vehicle height direction D3 of the inner face portion 21, the collision load F input to the underrun protector 1 is transmitted obliquely upward through the stays 14, causing the stress to be larger on the upper side than on the lower side in the underrun protector 1. Therefore, in this case, it is preferable to provide each of the lateral face portion 22, the longitudinal extension portion 23, and the lateral extension portion 32 on at least the upper side of the underrun protector 1. On the other hand, for example, if the stays 14 extend only from the lower side of the inner face portion 21 to the front side, there is a possibility that the stress acts larger on the lower side than on the upper side in the underrun protector 1. Thus, in this case, it is preferable to provide each of the lateral face portion 22, the longitudinal extension portion 23, and the lateral extension portion 32 on at least the lower side of the underrun protector 1.

The inner member 2 and the outer member 3 may be formed by bend forming processes using steel plates, or may each be formed of multiple parts bonded together by welding or the like. For example, the outer face portion 31 and the lateral extension portions 32 extending from the outer face portion 31 in the outer member 3 may be formed of an inherently continuous single plate, or multiple plates originally separated but integrated afterwards. As such, in the present specification, the expression "extend" means to be at least physically connected.

The configuration of the connection parts 4 described above is also an example. The connection part 4 is satisfactory as long as connecting the lateral face portion 22 and the lateral extension portion 32 overlapping with each other, and may be, for example, an adhesive part in which an adhesive is used in place of the above welding, or a fastening part in which fixtures such as a bolt and a nut are used. Further, the connection part 4 may be provided (continuously) over the entire area in the vehicle width direction D2 of the underrun protector 1.

The position in the vehicle length direction D1 of the connection part 4 should also not be limited to the above example. The connection part 4 may be provided at the intermediate position C between the inner face portion 21 and the outer face portion 31, or at a position closer to the inner face portion 21 than the intermediate position C is to the inner face portion 21.

The underrun protector 1 may be a front underrun protector (FUPD; Front Underrun Protecting Device) provided to the front portion of the vehicle 10. In such an underrun protector 1 serving as the front underrun protector, contrary to the rear underrun protector illustrated in the above embodiment, the outside in the vehicle length direction D1 corresponds to the front side, and the inside in the vehicle length direction D1 corresponds to the rear side.

The vehicle 10 to which the underrun protector 1 is applied should not be limited to a truck.

REFERENCE SIGNS LIST

- 1 underrun protector
- 2 inner member
- 3 outer member
- 4 connection part (welded part)
- 5 effective part
- 6 hollow part
- 10 vehicle
- 11 side rail
- 12 cross member
- 13 cargo box
- 14 stay
- 15 rear wheel
- 16 cap
- 21 inner face portion
- 22 lateral face portion
- 23 longitudinal extension portion
- 31 outer face portion
- 32 lateral extension portion
- C intermediate position
- D1 vehicle length direction
- D2 vehicle width direction
- D3 vehicle height direction
- L1 dimension in vehicle height direction D3 of longitudinal extension portion 23
- L2 dimension in vehicle length direction D1 of lateral extension portion 32
- L3 dimension in vehicle length direction D1 of lateral face portion 22
- L4 dimension in vehicle width direction D2 of connection part 4

L5 dimension in vehicle length direction D1 of effective part 5
S2 tensile strength of material used for inner member 2
S3 tensile strength of material used for outer member 3
t2 board thickness of inner member 2
t3 board thickness of outer member 3
X1 distance in vehicle height direction D3 between longitudinal extension portions 23
X2 distance between adjacent connection parts 4

The invention claimed is:

1. An underrun protector provided to at least one of a front portion and a rear portion of a vehicle, the underrun protector comprising:

an inner member having an inner face portion extending along a vehicle width direction and a vehicle height direction, a pair of lateral face portions respectively extending from both ends in the vehicle height direction of the inner face portion to an outside in a vehicle length direction, and a pair of longitudinal extension portions respectively extending from outer ends in the vehicle length direction of each of the pair of lateral face portions to directions approaching each other, the inner member having a lateral cross section perpendicular to the vehicle width direction being formed into a C-shape;

an outer member having an outer face portion extending along the vehicle width direction and the vehicle height direction, and a pair of lateral extension portions respectively extending from both ends in the vehicle height direction of the outer face portion to an inside in the vehicle length direction, the outer face portion being disposed on respective outsides in the vehicle length direction of the longitudinal extension portions, the lateral extension portions respectively overlapping the lateral face portions on an outside in the vehicle height direction, the outer member having a lateral cross section perpendicular to the vehicle width direction being formed into a U-shape; and connection parts connecting the lateral face portions and the lateral extension portions at locations where the lateral face portions and the lateral extension portions overlap each other;

the pair of lateral extension portions being formed shorter in the vehicle length direction than the pair of lateral face portions;

wherein the connection parts are provided at positions closer to the outer face portion than an intermediate position between the inner face portion and the outer face portion is to the outer face portion.

2. The underrun protector according to claim 1, wherein the outer face portion is disposed so as to be in contact with the pair of longitudinal extension portions.

3. The underrun protector according to claim 1, wherein the connection parts are welded parts connecting the lateral face portions and the lateral extension portions by welding, and are intermittently provided in the vehicle width direction.

4. The underrun protector according to claim 1, wherein a board thickness of the outer member is smaller than a board thickness of the inner member.

5. The underrun protector according to claim 1, wherein the outer member is formed of a material having a lower tensile strength as compared to the inner member.

* * * * *